(12) United States Patent
Akahoshi

(10) Patent No.: US 8,611,194 B2
(45) Date of Patent: Dec. 17, 2013

(54) RECORDING AND REPRODUCING APPARATUS AND METHOD

(75) Inventor: Kenji Akahoshi, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 1083 days.

(21) Appl. No.: 12/609,822

(22) Filed: Oct. 30, 2009

(65) Prior Publication Data

US 2010/0226228 A1  Sep. 9, 2010

(30) Foreign Application Priority Data

Mar. 6, 2009  (JP) ................................. 2009-052820

(51) Int. Cl.
*G11B 7/00* (2006.01)

(52) U.S. Cl.
USPC ........................................................ 369/44.32

(58) Field of Classification Search
None
See application file for complete search history.

(56) References Cited

U.S. PATENT DOCUMENTS

| 8,493,828 | B2* | 7/2013 | Akahoshi | 369/53.15 |
| 2006/0034411 | A1* | 2/2006 | Park | 375/376 |
| 2011/0188369 | A1* | 8/2011 | Takahashi et al. | 369/275.1 |

FOREIGN PATENT DOCUMENTS

JP  2008-510263  2/2006

OTHER PUBLICATIONS

"DVD-RAM Technology", TRICEPS Planning Department, TRICEPS Co., 2000.

* cited by examiner

*Primary Examiner* — Joseph Feild
*Assistant Examiner* — Parul Gupta
(74) *Attorney, Agent, or Firm* — Kilpatrick Townsend & Stockton LLP

(57) ABSTRACT

The invention solves the problem that data cannot be recorded on a disc because the number of registered Defect Lists (DFLs) has reached a limit and the problem that the access performance is reduced at recording data reproduction time. A cluster, which is normally reproduced during verification processing and is preceded and followed by one or more defective blocks, is also treated as a defective block and, together with the preceding and following defective clusters, recorded in an spare area for extending the range in which clusters are registered as Contiguous Re-allocated Defect (CRD) entries. This reduces the number of DFLs to solve the problem that data cannot be recorded on the disc and, in addition, reduces the number of seek operations to prevent the access performance from being reduced at reproduction time.

21 Claims, 11 Drawing Sheets

| | Status1 | Defective Cluster first PSN | Status2 | Replacement Cluster first PSN | |
|---|---|---|---|---|---|
| 306 | 0001 | A | 0001 | a | 312 |
| 308 | 0010 | D | 0010 | d | 313 |
| | 0001 | F | 0001 | e | |
| | 0010 | J | 0010 | i | |
| | 0001 | L | 0001 | j | |
| | 0010 | O | 0010 | m | |
| | 0001 | Q | 0001 | n | |
| | 0010 | U | 0010 | r | |
| | 0001 | W | 0001 | s | |
| | 0010 | Z | 0010 | v | |

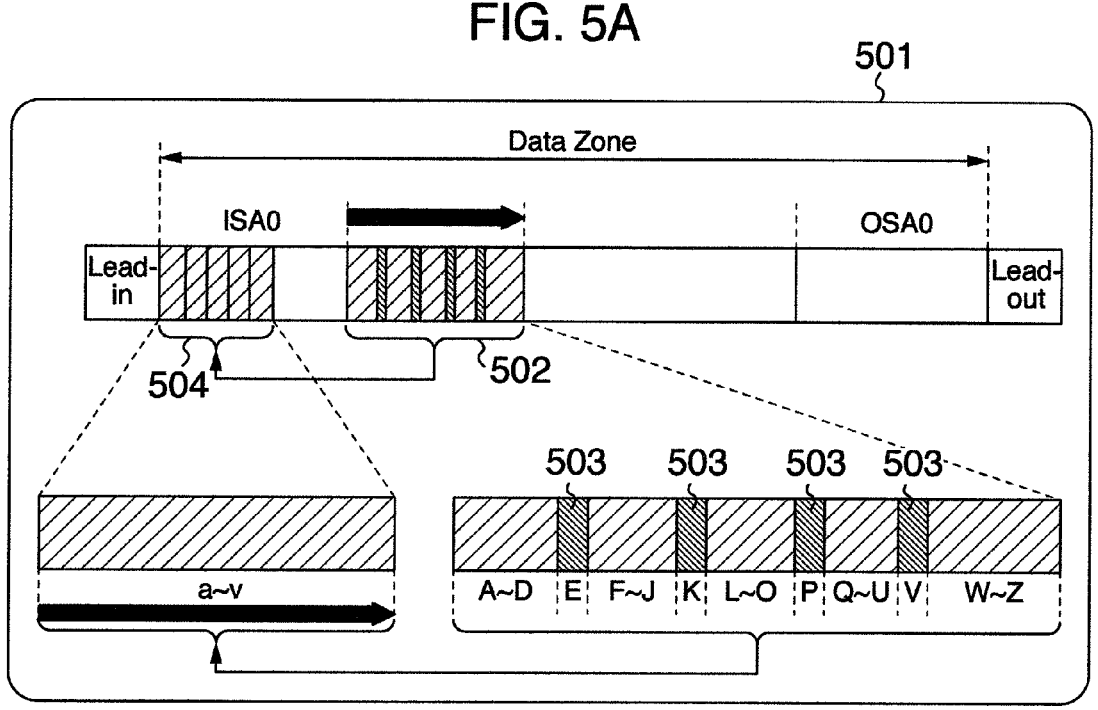
FIG. 5A
FIG. 5B
| Status1 | Defective Cluster first PSN | Status2 | Replacement Cluster first PSN |
|---|---|---|---|
| 0000 | A | 0000 | a |
| 0000 | Z | 0001 | v |
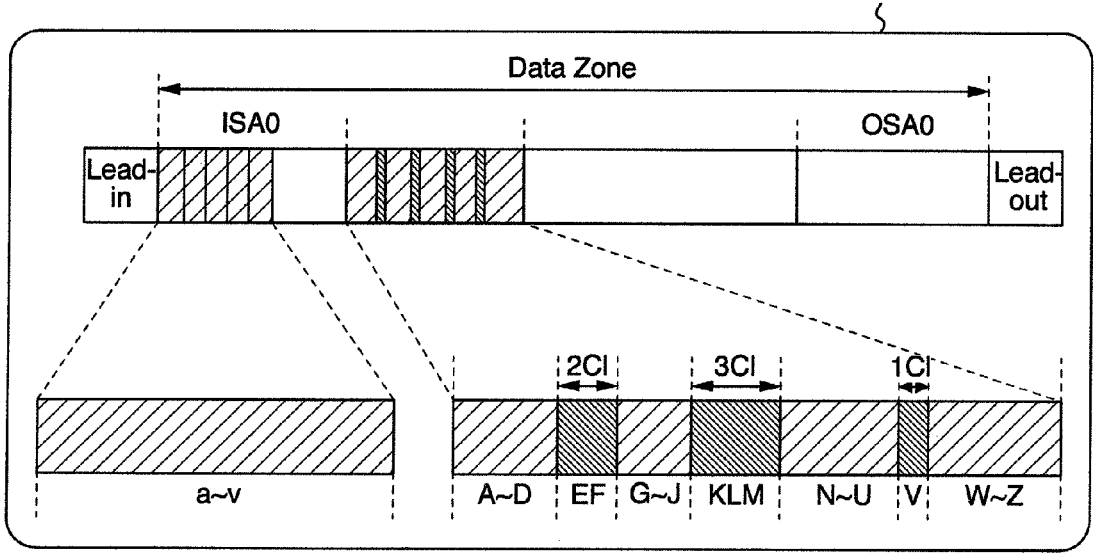
FIG. 5C

FIG. 6A
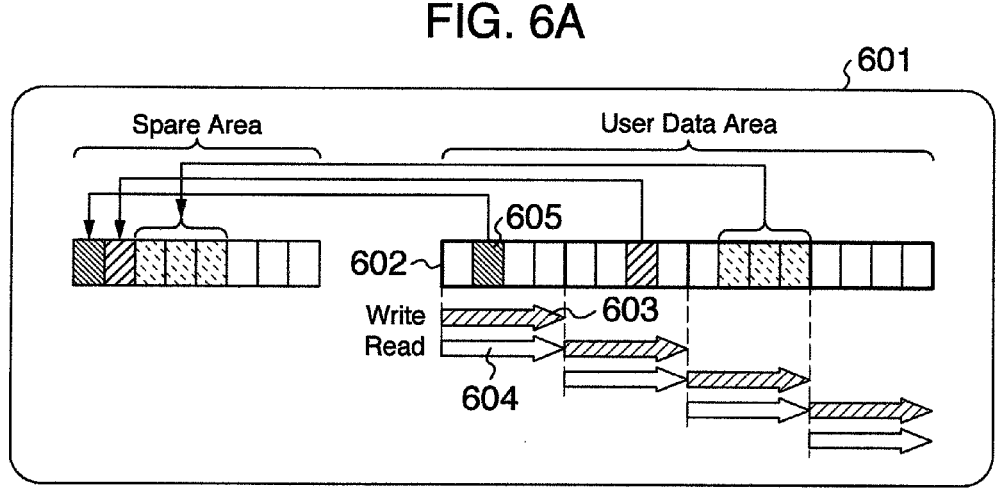
FIG. 6B
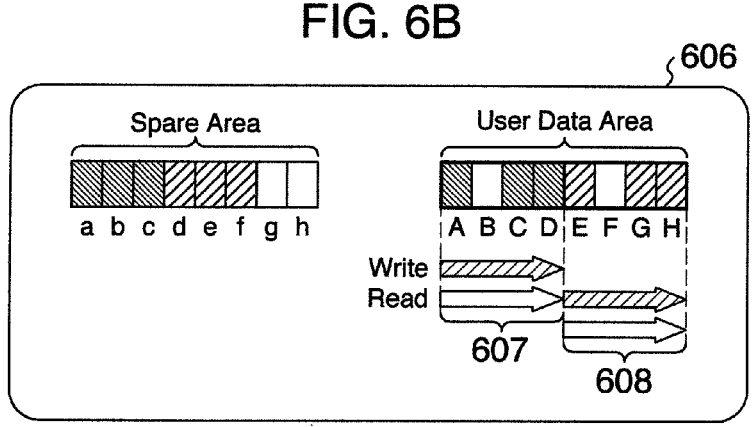
FIG. 6C
| Status1 | Defective Cluster first PSN | Status2 | Replacement Cluster first PSN | |
|---|---|---|---|---|
| 0000 | A | 0000 | a | } RAD ENTRY |
| 0000 | C | 0000 | b | } RAD ENTRY |
| 0000 | D | 0000 | c | } RAD ENTRY |

| | | | | |
|---|---|---|---|---|
| 0000 | A | 0000 | a | } RAD ENTRY |
| 0001 | C | 0001 | b | } CRD ENTRIES |
| 0010 | E | 0010 | d | |
| 0000 | G | 0000 | e | } RAD ENTRY |
| 0000 | H | 0000 | f | } RAD ENTRY |

610

611

| Status1 | Defective Cluster first PSN | Status2 | Replacement Cluster first PSN | |
|---|---|---|---|---|
| 0000 | A | 0000 | a | } RAD ENTRY |
| 0001 | C | 0001 | b | } CRD ENTRIES |
| 0010 | H | 0010 | g | |

616

FIG. 7A
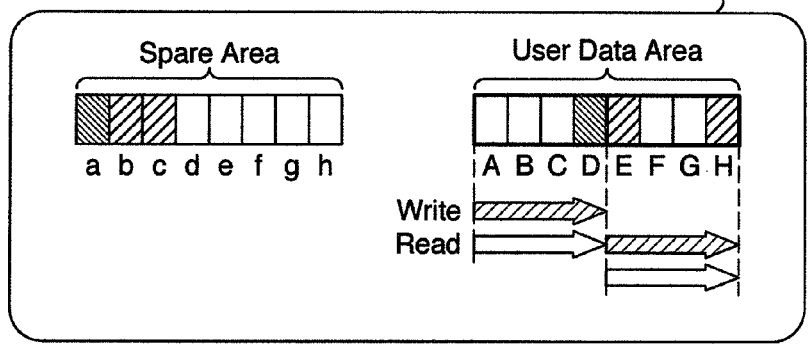
FIG. 7B
| Status1 | Defective Cluster first PSN | Status2 | Replacement Cluster first PSN | |
|---|---|---|---|---|
| 0000 | D | 0000 | a | } RAD ENTRY |
| 0001 | E | 0001 | b | } RAD ENTRY |
| 0010 | H | 0010 | c | } RAD ENTRY |
FIG. 7C
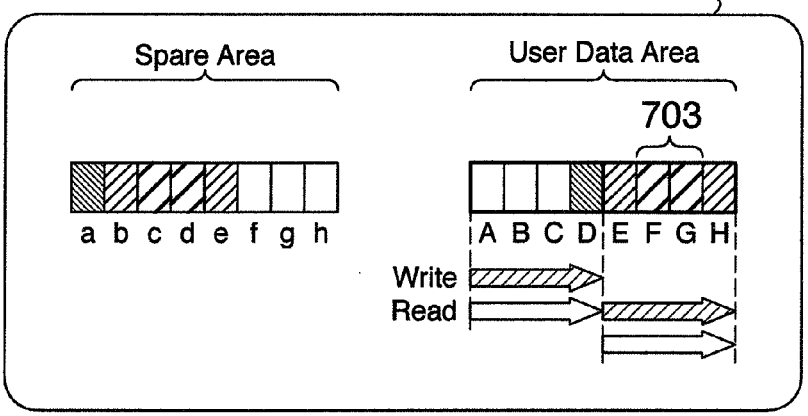

| Status1 | Defective Cluster first PSN | Status2 | Replacement Cluster first PSN |
|---|---|---|---|
| 0001 | D | 0001 | a |
| 0010 | H | 0010 | e |

CRD ENTRIES

FIG. 9A
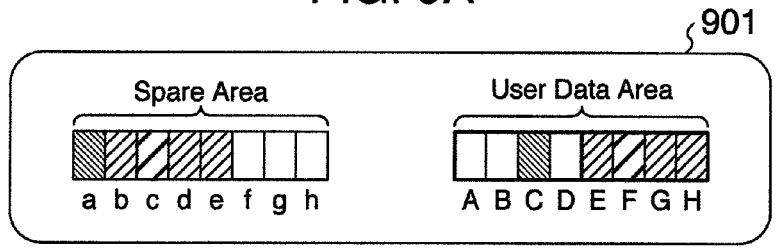
FIG. 9B
| Status1 | Defective Cluster first PSN | Status2 | Replacement Cluster first PSN | |
|---|---|---|---|---|
| 0000 | C | 0000 | a | } RAD ENTRY |
| 0001 | E | 0001 | b | } CRD ENTRIES |
| 0010 | H | 0010 | e | |
FIG. 9C
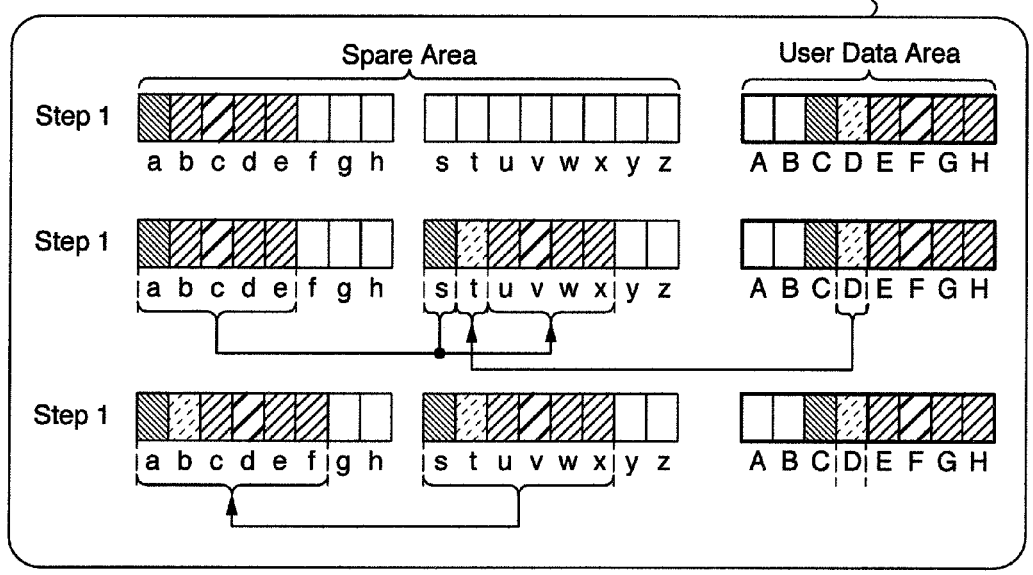
FIG. 9D
| Status1 | Defective Cluster first PSN | Status2 | Replacement Cluster first PSN | |
|---|---|---|---|---|
| 0001 | C | 0001 | a | } CRD ENTRIES |
| 0010 | H | 0010 | f | |

RECORDING AND REPRODUCING APPARATUS AND METHOD

INCORPORATION BY REFERENCE

The present application claims priority from Japanese application JP2009-52820 filed on Mar. 6, 2009, the content of which is hereby incorporated by reference into this application.

BACKGROUND OF THE INVENTION

The present invention relates to a medium recording and reproducing apparatus and a medium recording and reproducing method, and more particularly to the handling of defect lists (DFL) in an apparatus that records and reproduces data using a data recording area reserved for spare area recording on a medium.

Today, recording and reproducing apparatuses are available that use a semiconductor laser to focus a laser beam onto an optical disc-like recording medium for recording. Those apparatuses include a CD-R/RW (CD Recordable/Rewritable), DVD±R/RW (DVD±Recordable/Recordable Disc), DVD-RAM (DVD-Rewritable), and Blu-ray Disc (hereinafter called a BD). A defective part (defect) is sometimes generated on a rewritable or recordable optical disc medium, for example, by a scratch caused in a part of the medium, fingerprints, contamination, or recording film degradation. If data is recorded in such a defective part, there is a high possibility that data cannot be read.

As one of the methods for avoiding recording in a defect on the disc surface and prolonging the disc life, the defect management method, called Linear Replacement, is provided for recording data, not in the defective part, but in an spare area (alternative recording area) reserved on the same optical disc. This method, which is applied to a DVD-RAM, is described in pages 29-31 in "DVD-RAM Technology" by TRICEPS Planning Department, TRICEPS Co., 2000. This technology is applied also to a BD and if, while data is recorded in the user data area on a cluster basis, data cannot be recorded in a cluster or data is successfully recorded in a cluster but cannot be successfully verified, the cluster is recorded in an spare area provided on the disc. A cluster is the minimum recording block unit in which data is recorded in the present invention. And, the address information on a detected defective cluster and the address information on a cluster in the spare area in which data is recorded are registered as the defect lists (DFL) in the management area provided on the disc. Several types of DFL are defined. For example, a DFL is registered as a reallocated defect entry (RAD: Re-allocated Defect) when the defective area is composed of one cluster only, and as a contiguous reallocated defect entry (CRD: Contiguous Reallocated Defect) when the defect area is composed of contiguous two or more clusters. For example, when a defect is found in ten contiguous clusters, ten DFLs are required for RAD entry registration while only two DFLs are required for CRD entry registration and, as a result, the number of DFLs registered in the management area is reduced. This is described in JP-A-2008-510263. At reproduction time, the DFLs are read to read data, not from the cluster position specified by the recording instruction from a higher level device, but from the cluster in which data has been written alternatively.

SUMMARY OF THE INVENTION

Now, consider that there are multiple defective clusters in continuous addresses A-Z in the user data area. Assume that one alphabetic letter corresponds to one cluster and that clusters E, K, P, and V are clusters recorded normally in the user data area and all remaining clusters are defective clusters recorded in the spare area. In this case, the DFLs from A to Z are described as follows using DFLs described above: CRD entry: A-D, F-J, L-O, Q-U, and W-Z.

Registering the defective clusters described above using CRD entry requires a total of 10 lists because two lists are required for specifying a sequence of contiguous clusters, one for the start address and the other for the end address of each list. The number of ranges that can be registered as DFLs is limited and so, once the number of registered DFLs reaches the limit, the spare area recording processing cannot be performed even when there is still free space in the spare area. Therefore, the problem is that data, which involves recording in the spare area, cannot be recorded.

From the viewpoint of the read access performance when continuously reproducing clusters A-Z, the performance is decreased by the frequent seek operation between the user data area and the spare area. More specifically, one seek operation is required for each arrow of D→E→F, J→K→L, O→P→Q, and U→V→W. Therefore, another problem is that an increase in the number of registered DFLs results in a decrease in the performance of the recording and reproducing apparatus. In view of the foregoing, those are the problems to be solved by the present invention and, with focus on the DFL registration method, an object of the present invention to decrease the number of DFLs that are registered.

The object described above is achieved by the invention set forth in the appended claims.

The present invention treats a normal cluster between defective clusters as a defective cluster to increase the range that can be registered as a CRD entry and thereby decrease the number of DFLs that may be registered. By avoiding the condition in which data cannot be written on a disc because the number of registered DFLs has reached the limit value, the present invention prolongs the disc life in terms of the number of rewritable times and suppresses a decrease in the disc access performance at reproduction time.

BRIEF DESCRIPTION OF THE DRAWINGS

These and other features, objects and advantages of the present invention will become more apparent from the following description when taken in conjunction with the accompanying drawings wherein:

FIGS. 5A, 5B, and 5C are diagrams showing a problem solving method of the present invention.

FIGS. 6A-6F are diagrams showing examples in which the recording and reproduction operation is performed on an actual recording and reproducing apparatus (1).

FIGS. 7A-7E are diagrams showing examples in which the recording and reproduction operation is performed on an actual recording and reproducing apparatus (2).

FIG. 9A-9D are diagrams showing the operation of spare area recording data reconstruction.

DETAILED DESCRIPTION OF THE EMBODIMENTS

Embodiments of the present invention will be described below with reference to the drawings.

First Embodiment

Figure 1:
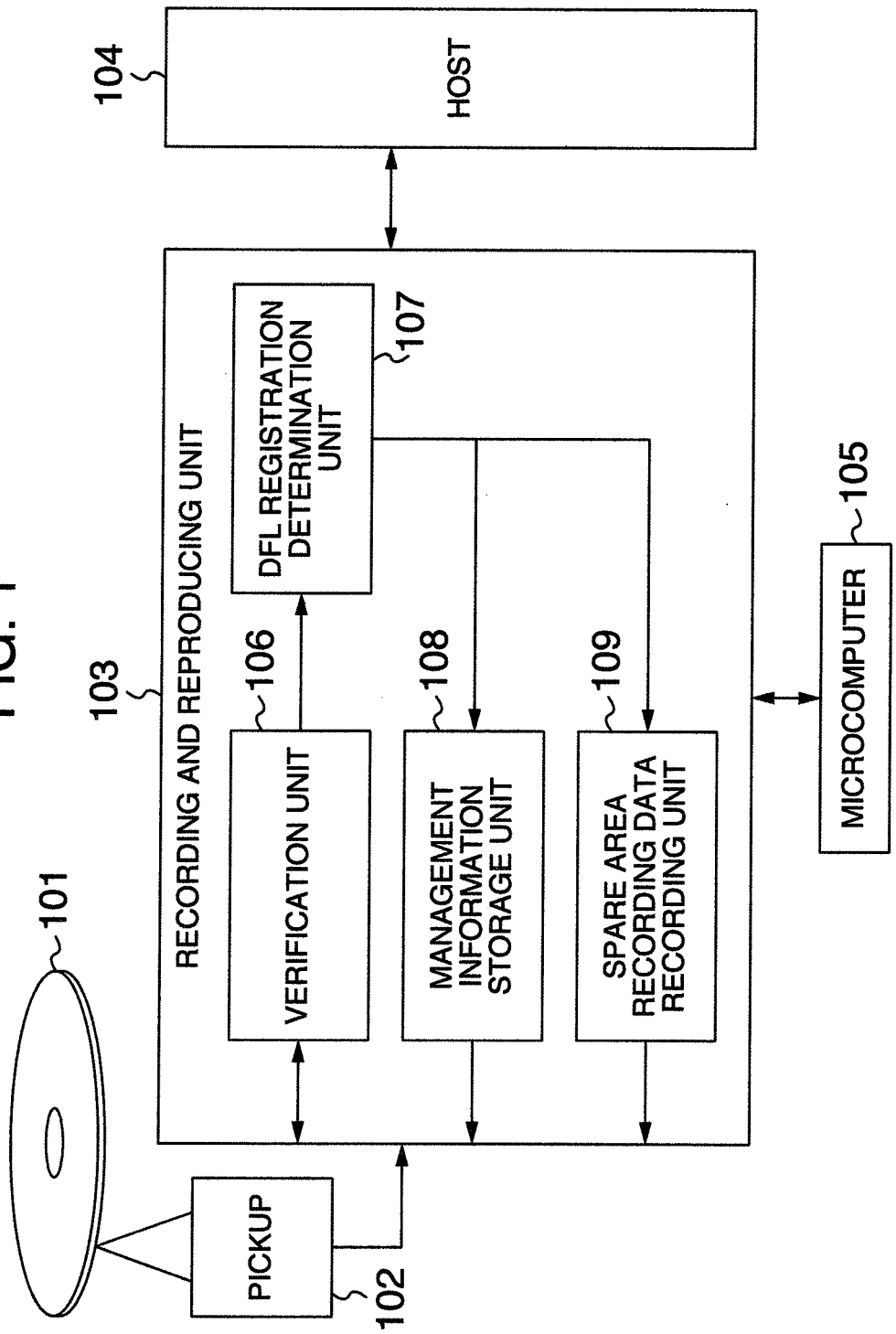
FIG. 1 is a block diagram showing the configuration of a recording and reproducing apparatus in a first embodiment of the present invention.

The following describes a first embodiment of the present invention with reference to the drawings. FIG. 1 is a block diagram showing the configuration of a recording and reproducing apparatus in this embodiment of the present invention. This embodiment will be described below with reference to the drawings.

Referring to the figure, the numeral 101 indicates an optical disc on which the user data recording area, disc management information recording area, and spare area processing data recording area are allocated and to and from which data can be recorded and reproduced, the numeral 102 indicates a pickup that reads recorded signals from the optical disc 101, and the numeral 103 indicates a data recording and reproducing unit. Although not shown in the figure, the data recording and reproducing unit 103 comprises a servo control unit that controls the pickup 102, a data modulation/demodulation unit, an error correction unit, a temporary storage unit that temporarily stores data, a temporary storage unit control unit that controls the temporary storage unit, and a host I/F unit that sends and receives data to and from a host 104 according to the protocol such as ATAPI (AT Attachment Packet Interface). That is, the data recording and reproducing unit 103 comprises all units necessary for outputting data, read from the pickup, to the host 104 that is external to the apparatus or for recording data, received from the host 104, onto a disc. The numeral 105 indicates a microcomputer that controls the data recording and reproducing unit. The numeral 106 indicates a verification unit that performs verification processing in which data recorded on the optical disc 101 is reproduced and the reproduced result is checked, the numeral 107 indicates a DFL registration determination unit that determines the DFL registration type based on the result of the verification unit 106, the numeral 108 indicates a management information storage unit that stores management information, which includes the DFL information, in the management information storage area on the optical disc 101 based on the result of the DFL registration determination unit 107, and the numeral 109 indicates an spare area data recording unit that records spare area recording data in the spare area on the optical disc 101 based on the result of the DFL registration determination unit 107.

Figure 2:
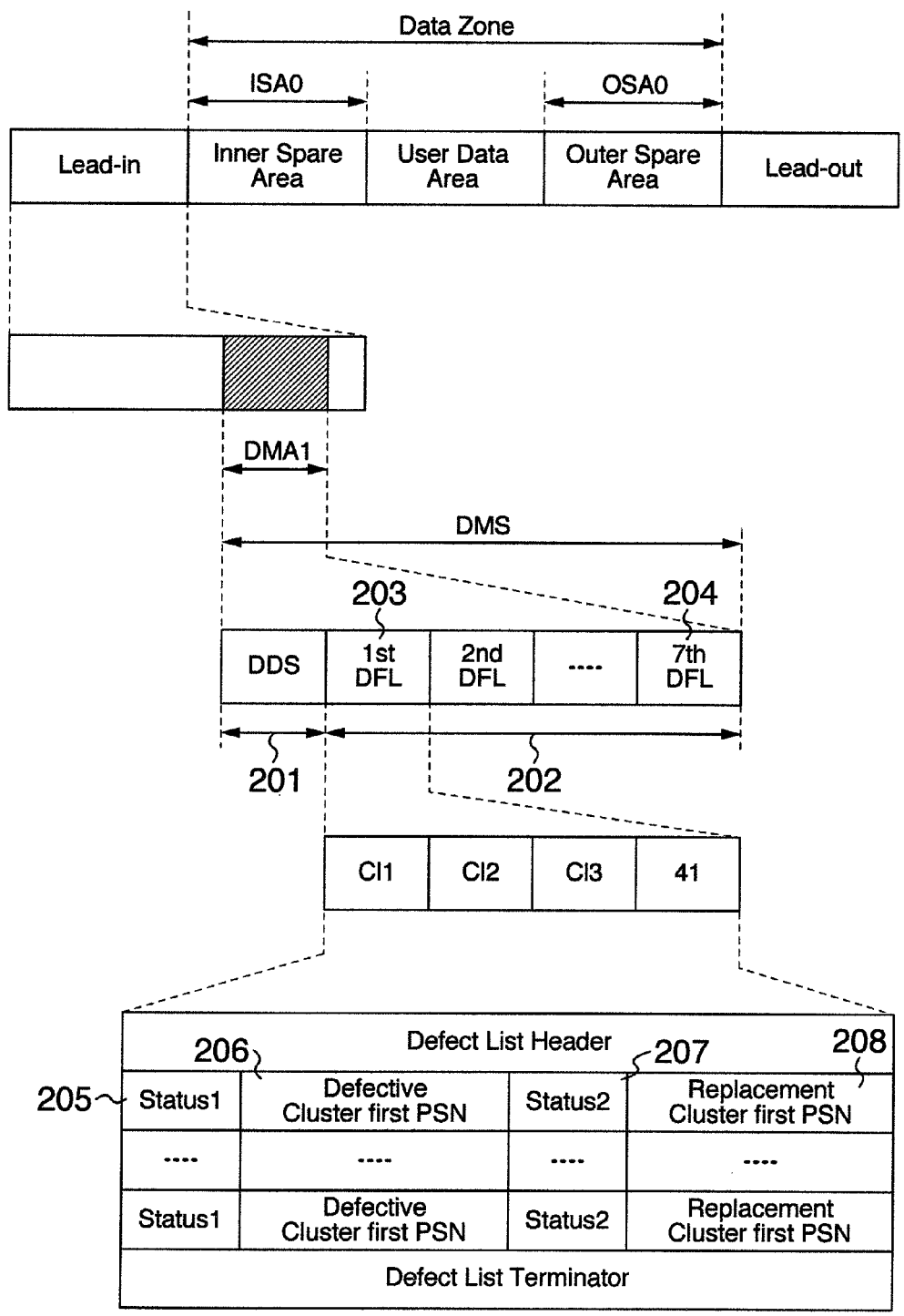
FIG. 2 is a diagram showing the general structure of a BD-RE SL (Single Layer) disc.

FIG. 2 is a diagram showing the general structure of a BD-RE SL (Single Layer) disc. The disc is composed roughly of three areas: Lead-in area, Data Zone area, and Lead-out area. In addition, the Data Zone area is composed of the ISA0 (Inner Spare Area 0) area that is an inner spare area processing data recording area, the User Data Area, and the OSA0 (Outer Spare Area 0) area that is an outer spare area processing data recording area. The DMA (Disc Management Area), in which management information on the recording status is recorded, is provided in both the Lead-in area and the Lead-out area. Although DMAs 1-4 are defined in the BD-RE SL, only DMA1 is shown in this example for ease of explanation. The DMA area, which is configured by the DMS (Disc Management Structure), comprises a DDS (Disc Definition Structure) 201 and DFLs (Temporary Defect List) 202. The DDS includes the DFL allocation information and the disc management information such as the ISA0 and OSA0 capacity information. The DFLs are used primarily as lists for managing the alternate locations corresponding to defective locations on the disc.

The following describes the DFLs more in detail. The DFLs of BD-RE SL are composed of the 1st position of DFL indicated by the numeral 203 to the 7th position of DFL indicated by the numeral 204. Out of those positions, only one position is effective in practice. At the start of recording, the 1st position 203 is used first. After data is overwritten many times in the block and, if data cannot be recorded properly in the block and cannot be reproduced during the verification, the effective position moves to the 2nd position of DFL. Therefore, once all positions, 1st to 7th position of DFL, are used up, any more DFL cannot be registered and so data involving recording in the spare area cannot be written. However, even if 1st to 7th positions of DFL are not used up, there is a case in which a DFL cannot be registered and, as a result, data involving recording in the spare area cannot be recorded. The following describes that case. As shown in the figure, one position is composed of four clusters and DFLs are registered using one to four clusters.

The DFLs are preceded by the Defect List Header and terminated by the Defect List Terminator. The format of a registered DFL is composed of a Status1 area 205 that indicates the registration status of the alternate source, Defective Cluster first PSN that indicates the alternate source address 206, a Status2 area 207 that indicates the registration status of the alternate destination, and Replacement Cluster first PSN that indicates the alternate destination address 208. The value in the Status area depends on whether the alternate source block is composed of one cluster or multiple contiguous clusters. When one cluster is alternated, the value of Status1 and Status2 is 0000b (in binary) to indicate a RAD entry. When multiple contiguous clusters are alternated, the values of Status1 and Status2 are not that of RAD entry but one piece of CRD entry information composed of two rows. That is, in the first row, the value of the Status1 area 205 is 0001b, the alternate source address 206 is the start address of the contiguous alternate source clusters, the value of the Status2 area 207 is 0010b, and the alternate destination address 208 is the start address of the contiguous alternate destination clusters. In the second row, the value of the Status1 area 205 is 0001b, the alternate source address 206 is the end address of the contiguous alternate source clusters, the value of the Status2 area 207 is 0010b, and the alternate destination address 208 is the end address of the contiguous alternate destination clusters. That is, when three or more RAD entries contiguously occur, CRD entry registration will result in a reduction in the number of DFL registration entries.

Figures 3A, 3B:
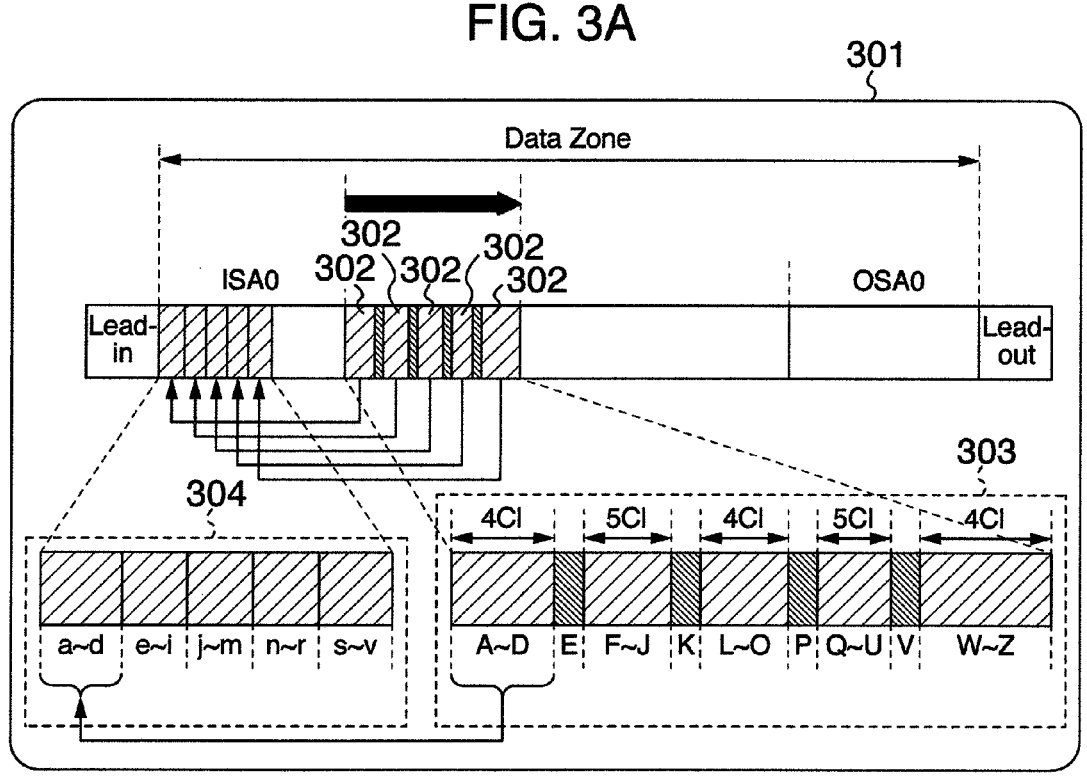
FIGS. 3A and 3B are diagrams showing a defect processing method for the BD-RE SL.

Next, the following describes the defect processing method for BD-RE SL with reference to FIGS. 3A and 3B.

The numeral 301 in FIG. 3A indicates a diagram showing the configuration of a disc with the spare areas ISA0 and OSA0 formatted thereon. As shown in FIG. 2, the disc is composed of the Lead-in area, Data area, and Lead-out area, and ISA0 is allocated in the disc inner periphery side and OSA0 is allocated in the disc outer periphery side. Those areas are used for the spare areas of defects detected while data is being recorded.

Next, considering that CRD entry, which is used by BD-R, is applied also to BD-RE, the following describes the spare area recording processing performed when defects are detected during recording.

The spare areas ISA0 and OSA0 on a BD-RE disc are allocated in advance according to an instruction from the host device at disc formatting time (more precisely, an instruction from an application). The example shows that, while data is being recorded to the addresses indicated by the hollow arrow in the figure, the defective clusters indicated by the numeral 302 in the figure are detected and the data of those clusters is written in the spare area ISA0. Each solid arrow in the figure indicates the correspondence between an alternate source area that is found defective by the verification and an alternate destination area that is an alternate recording destination. The DMA, in which the location information on the defective areas and the spare areas is recorded, is allocated in the Lead-in area and Lead-out area (see FIG. 2).

Assume that the defects indicated by the numeral 302 are detected during the recording and that the spare area recording processing indicated by the solid arrows is performed. In the part indicated by the numeral 303, each of A-Z indicates one cluster of contiguous data. In the part indicated by the numeral 303, the result of the verification of clusters A-Z is shown, that is, only clusters E, L, P, and V are normally reproducible clusters and the remaining clusters, A-D, F-J, L-O, Q-U, and W-Z, are non-reproducible clusters. In this case, the non-reproducible clusters are recorded alternatively in ISA0 as a CRD entry (of course, the clusters may also be recorded in OSA0). Each of clusters a-v in ISA0 also indicates one cluster of contiguous data, and the alternate source data clusters A-D, F-J, L-O, Q-U, and W-Z are stored respectively in alternate destination data clusters a-d, e-i, j-m, n-r, and s-v. The table 305 in FIG. 3B shows the DFL registration status in this case. The numerals 306 and 307 indicate the start address of the contiguous alternate source clusters, and the contiguous clusters continue to the end address of the alternate source clusters indicated by the numerals 308 and 309. As the information corresponding to the alternate source information, the numerals 310 and 312 indicate the start address of the contiguous alternate destination clusters and the numerals 311 and 313 indicate the end address of the contiguous alternate destination addresses. The remaining DFLs are registered in the same way.

From the description above, because the number of DFLs that can be registered is limited as shown in FIG. 2 and DFLs are registered continuously by the spare area recording processing as shown in FIG. 3, there is a possibility that the number of registered DFLs will reach the limit before the spare area is exhausted depending upon the result of the spare area recording processing and, thus, the recording processing involving recording in the spare area cannot be performed.

Figure 4:
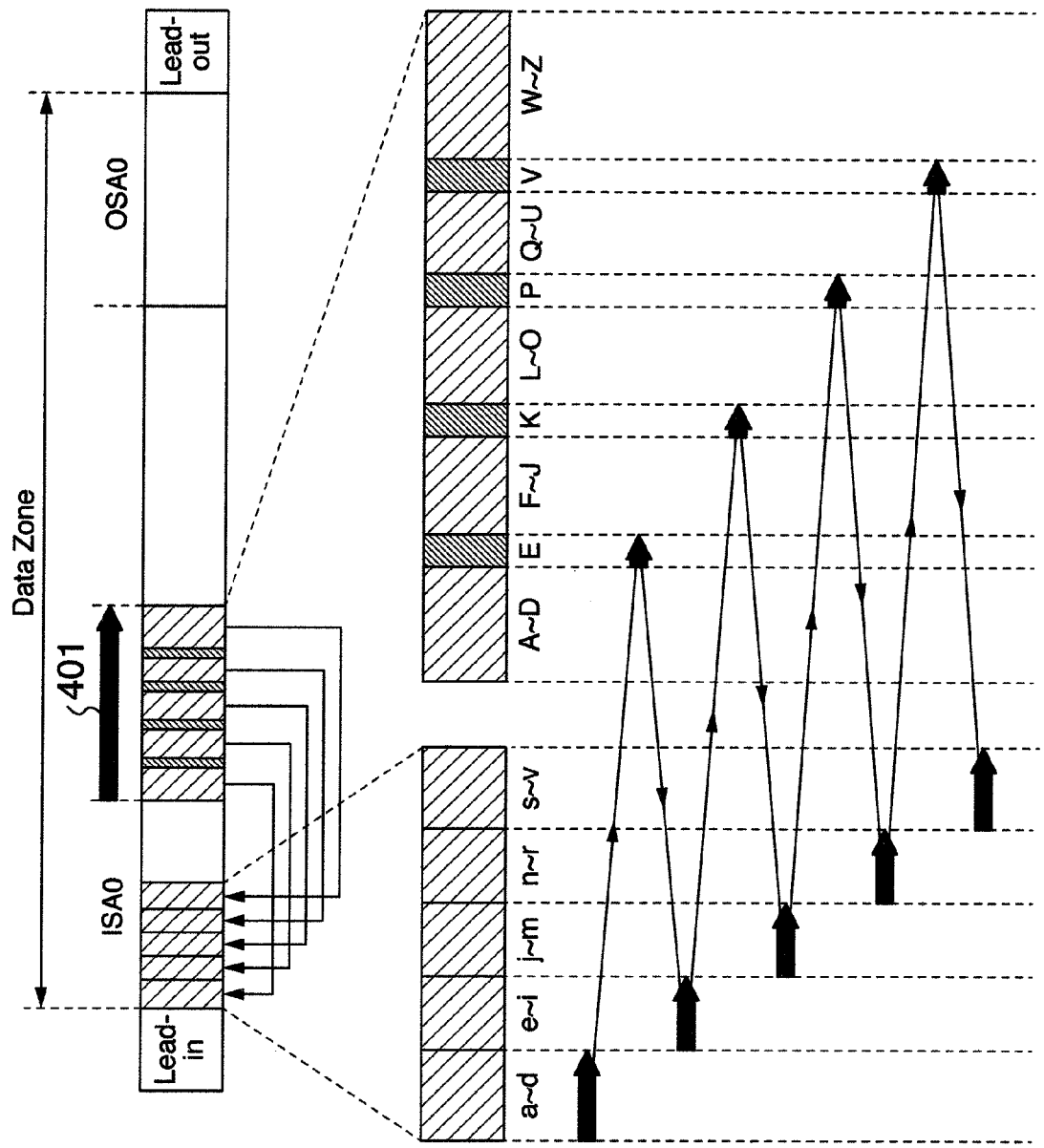
FIG. 4 is a diagram showing an access performance decrease at disc reproduction time.

In addition to this problem, the following describes, with reference to FIG. 4, another problem that the access performance at disc reproduction time is decreased. FIG. 4 shows a disc for which the same spare area recording processing as that shown in FIG. 3 has been performed. To reproduce data in the order indicated by the arrow 401, the data of E, K, P, and V recorded in the user data area is read from the user data area, and the data of the defective clusters A-D, F-J, L-O, Q-U, and W-Z is read respectively from the alternate destination clusters a-d, e-i, j-m, n-r, and s-v. Therefore, the data must be reproduced in the order indicated by the arrows in the figure. Because this reproduction operation requires the movement involving frequent seek operations between the user data area and the spare area, the access performance is apparently reduced as compared with that of the operation in which the user data areas A-Z are read continuously. Referring to FIGS. 3A and 3B and FIGS. 5A, 5B, and 5C, the following describes the problem that data cannot be recorded because of an increase in the number of registered DFLs and also describes a unit that solves the access performance decrease at reproduction time.

The status indicated by the numeral 501 in FIG. 5A is the status in which the same spare area recording processing as that indicated by the numeral 301 in FIG. 3A has been performed. The following describes the processing performed for the clusters 503 the data of which need not be recorded in the spare area during the spare area recording processing. Although the clusters recorded and reproduced normally should not be recorded in the spare area, those clusters 503 are treated intentionally as defective clusters. That is, all clusters A-Z are treated as defective clusters. Therefore, after data is recorded as shown by the arrow in the area 502, the data of all clusters A-Z is treated as data to be recorded in the spare area, and all clusters indicated by the numeral 502 are recorded in the area 504 in the spare area. The DFL registration status table in this case requires only one CRD entry registration (two rows) as indicated by the numeral 505 in FIG. 5B, meaning that the number of registered DFLs may be significantly reduced as compared with that in the DFL registration status table indicated by the numeral 305 in FIG. 3B. The numeral 506 in FIG. 5C shows an example in which a normally reproducible cluster 503 shown in 501 is composed of, not one cluster, but multiple clusters. Even when two or three contiguous clusters are treated as normally reproducible cluster, the DFL registration status table is the same as that indicated by the numeral 505. This means that any number of contiguous clusters may be treated as normal clusters.

To prevent the access performance from being decreased at reproduction time, the area 504 is reproduced sequentially to reproduce the area 502 with no need for frequent seek operation between the user data area and the spare area such as that shown in the example in FIGS. 3A and 3B. In addition, even if normally reproducible clusters are treated as defective clusters, the only difference is whether host-requested data is read from the user data area or from the spare area and so, the host has no problem because the same data is returned in response to the read instruction.

In addition, with reference to FIGS. 6A-6F and FIGS. 7A-7E, the following describes an example considering the actual recording and reproducing operation of the recording and reproducing apparatus. The recording and reproducing apparatus, which performs the verification operation, usually performs the verification processing for multiple clusters at a time. The disc recording status diagram 601 in FIG. 6A indicates the verification processing in which data is recorded and reproduced repeatedly, four clusters at a time. The bold frame indicated by the numeral 602 is a verification processing unit (four clusters in this figure). The recording processing indicated by the numeral 603 and the reproduction processing indicated by the numeral 604, which is performed after the recording processing, are combined to form one verification processing unit. If a defective cluster indicated by the numeral 605 is detected as a result of the verification processing, data is recorded immediately in the spare area. Thereafter, data is recorded and verified sequentially, one verification processing unit at a time. With the above-described verification processing in mind, the following describes the processing indicated by the numeral 606 in FIG. 6B. The patterned clusters in the user data area are clusters that are found non-reproducible as a result of verification, and blank clusters are defective clusters that are found normal as a result of the verification. The patterned clusters in the spare area indicate the alternatively recorded data corresponding to the defective clusters in the user data area, and the blank clusters indicate unrecorded clusters. When the verification processing indicated by the numeral 607 is finished, the DFL registration status table looks like the one indicated by the numeral 609 in FIG. 6C. All non-reproducible clusters are registered as RAD entries using three rows (The last two rows may be registered as a CRD entry but, in this case, the number of DFL registration entries is also three and the number of rows is the same). After that, the area 608 is verified and, as a result, the DFL registration status table is changed to the one indicated by the numeral 610 in FIG. 6D. Because clusters C-E may be registered as a CRD entry, the number of DFLs is two, not three that would be required if the clusters are registered as RAD entries.

Figures 6D, 6E, 6F:
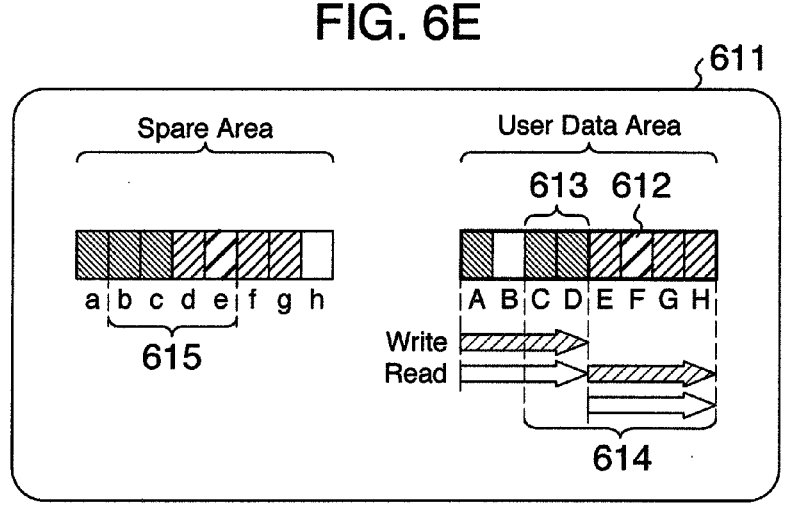

Now, consider that cluster F indicated by the numeral 612 in the disc recording status diagram 611 in FIG. 6E is treated as a defective cluster. By treating a normally reproducible cluster, which is not usually recorded in the spare area, as a defective cluster, the clusters C-H 614, created by combining the clusters E-H with the result of the previous verification 613, may be registered as a CRD entry.

Figures 7D, 7E:
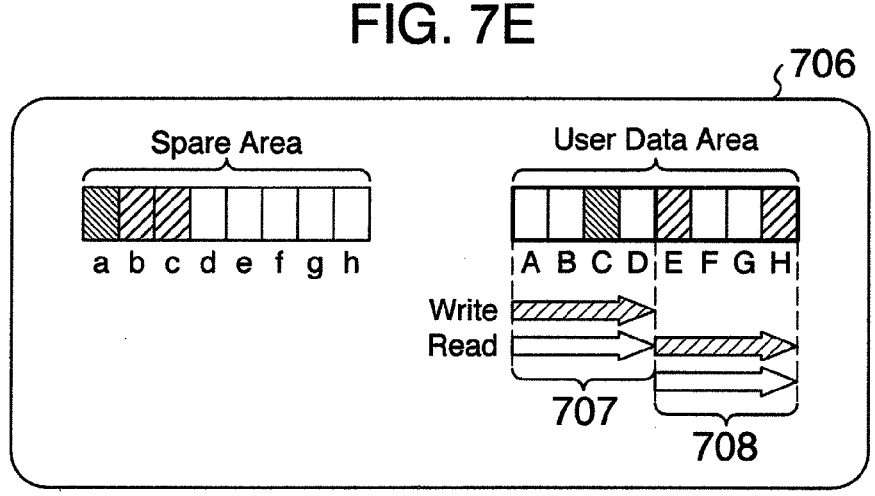
Figure 8:
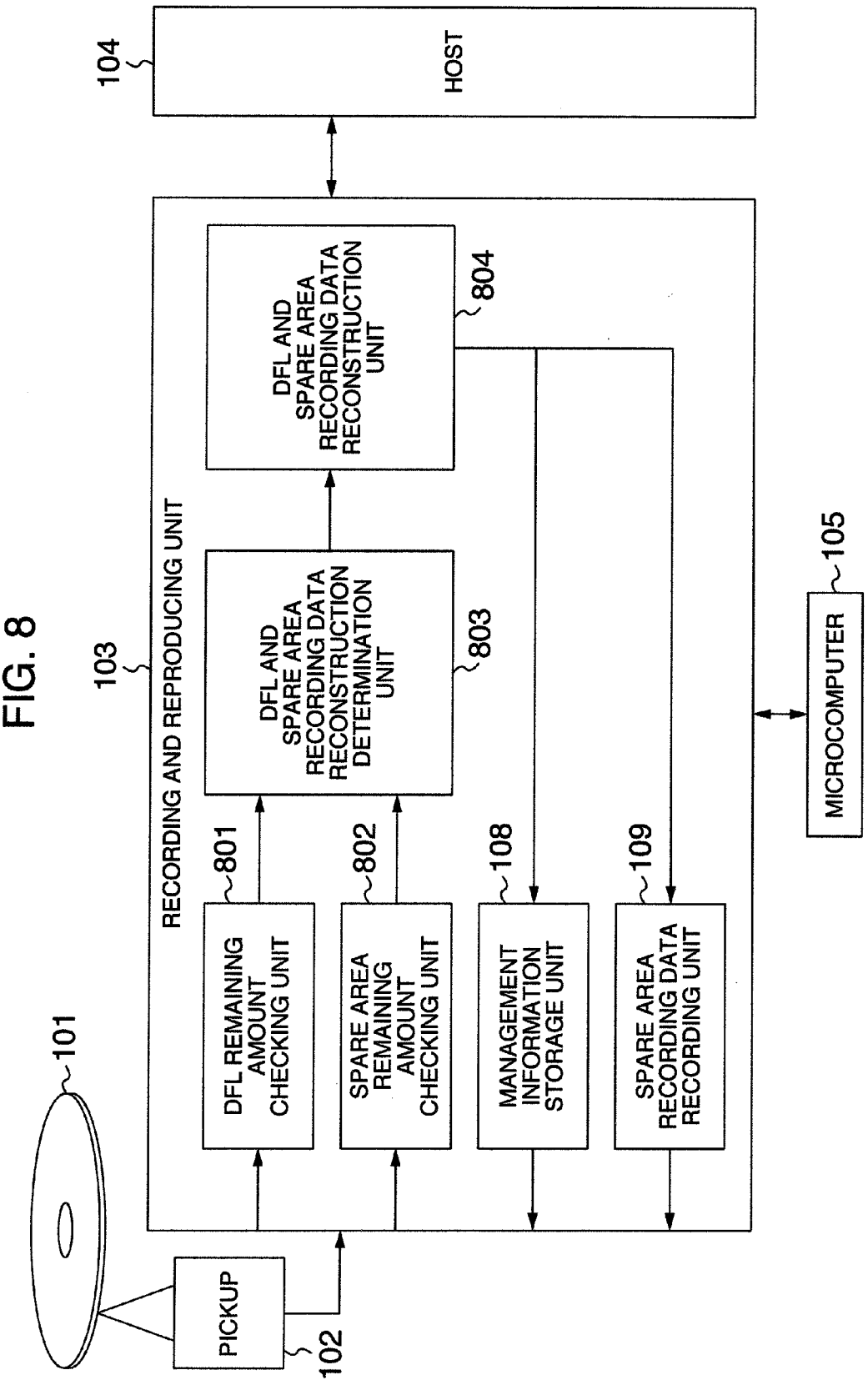
FIG. 8 is a block diagram showing the configuration of a recording and reproducing apparatus in a second embodiment of the present invention

The spare area corresponding to the clusters 614 is changed to the area indicated by the numeral 615. The DFL registration status table is as shown by the numeral 616 in FIG. 6F. The comparison between this DFL registration status table with that indicated by the numeral 610 shows that the amount of data required for the table is reduced by two rows. The disc recording status diagrams 701 in FIGS. 7 and 704 in FIG. 7C are examples in which the normally reproducible clusters 703, composed of F and G, in the user data area are treated as a defective cluster. Unlike the example indicated by the numeral 611, two contiguous normally reproducible clusters are treated as defective clusters. In this example, the DFL registration status tables are as shown by the numeral 702 in FIG. 7B and the numeral 705 in FIG. 7D and, as shown, the amount of data required for the table is reduced by one row. In this way, when two or more normally reproducible clusters may are treated as defective clusters, the processing may be performed with no problem.

As described above, because the number of normally reproducible clusters that are treated as defective clusters depends on the number of verification execution clusters, the remaining amount of the spare area, and the remaining amount of DFL registration, the designer of a recording and reproducing apparatus can freely set those values.

Attention should be paid to the example indicated by the numeral 706 in FIG. 7E. This example differs from the example indicated by the numeral 704 in that cluster C, not cluster D, is defective. In this case, the defective cluster C detected during the verification processing 707 is recorded in cluster a in the spare area. After that, cluster E is found as a defective cluster by the verification processing 708. Therefore, to treat cluster D as a defective cluster, cluster D that was read during the previous verification processing must be read again. Even if the data of cluster D remains recorded internally, cluster D not recorded in the spare area during the past verification processing 707 must be recorded and so this processing is wasteful. Because clusters E and H that are verified by the verification processing 708 are not yet recorded in the spare area, the wasteful reproduction operation and the recording operation are not performed at all. Therefore, when one or more clusters including the last-recorded cluster (cluster D in this case) of the immediately preceding verification processing unit are normally reproducible clusters as in the disc recording status 706, the DFLs should be independently registered for the verification processing 708. In this case, the designer of a recording and reproducing apparatus should decide whether cluster E and cluster H are registered individually as a RAD entry, or cluster E to cluster H collectively as a CRD entry. In either way, the number of rows used for the DFL registration is two for both registrations in this example.

Second Embodiment

Next, the following describes a second embodiment of the present invention with reference to FIG. 8 and FIGS. 9A-9D. The configuration of this embodiment is almost similar to that of the first embodiment except that a DFL remaining amount checking unit 801, an spare area remaining amount checking unit 802, a DFL and spare area recording data reconstruction determination unit 803, and a DFL and spare area recording data reconstruction unit 804 are provided instead of the verification unit 106 and the DFL registration determination unit 107. The DFL remaining amount checking unit 801 is a unit that checks the number of DFLs registered in the management area on the disc, and the spare area remaining amount checking unit 802 is a unit that checks the remaining amount of the spare area on the disc. Based on the remaining amount checking results of the DFL remaining amount checking unit 801 and the spare area remaining amount checking unit 802, the recording and reproducing apparatus uses the DFL and spare area recording data reconstruction determination unit 803 to determine if the DFLs and the spare area recording data should be reconstructed. The designer of the recording and reproducing apparatus may freely decide whether and when to reconstruct the DFLs and spare area recording data. For example, the DFLs and the spare area recording data may be reconstructed either after data is neither recorded nor reproduced to or from the recording and reproducing apparatus for a fixed period of time as in the case when a DVD+RW disc is formatted in the background or when the DFL remaining amount checking unit 801 determines that the number of registered DFLs is close to or has reached the limit value and the DFL and spare area recording data reconstruction determination unit 803 has decided that reconstruction is necessary.

Note that, however, the reconstruction processing may be performed in either case only when the spare area remaining amount checking unit 802 has confirmed that the half or more of the whole capacity of the spare area, reserved on the disc, is available for use. The following describes the reason with reference to FIGS. 9A-9D. Consider the case in which the user data area and the spare area are those in the diagram indicated by the numeral 901 in FIG. 9A and that the DFL registration status table at that time is the one indicated by the numeral 902 in FIG. 9B. The reconstruction processing, in which a normally reproducible cluster D is treated as a defective cluster, is performed as follows. First, step 1 indicates the state before the reconstruction processing is started. In step 2, the clusters are copied to the unused areas s-z of the spare area as follows: cluster a is copied to cluster s, clusters b-e to clusters u-x, and cluster D to cluster t. An unused area refers to an area not logically being used. An area, which is on a disc that was used several times and which was physically used in the past, is also called an unused area if not being logically used.

In step 3, the copied clusters s-x are written back to clusters a-f. At this time, the DFL registration status table is changed to the one indicated by the numeral 904 in FIG. 9D. The comparison between this table with the table indicated by the numeral 902 shows that the number of registered DFL rows is reduced by one. As shown in this example, the reconstruction of already-recorded spare area recording data requires that all spare area recording data be once saved and then written back at a time. This means that, unless the half or more of the whole capacity of the spare area is free, the whole spare area cannot be copied and therefore the reconstruction processing cannot be performed.

The description "the reconstruction processing may be performed only when the half or more of the whole capacity of the spare area is free", though given above, is not true if the recording and reproducing apparatus has a temporary storage unit in which all data to be reconstructed can be stored at a time and, in this case, the reconstruction processing may be performed regardless of the remaining amount of the spare area. In addition, though the description "the designer of the recording and reproducing apparatus may freely decide whether and when to reconstruct" is given above, the same effect may be achieved if the processing is started by receiving an instruction, requested by a command defined by the I/F standard such as ATAPI, from the host of the higher-level device connected to the recording and reproducing apparatus. Note that, while the reconstruction processing is being performed, the usual recording and reproducing processing cannot be performed at the same time. Therefore, if an instruction requesting usual recording and reproducing processing is received during the execution of the reconstruction processing, one of the following options is selected: one option is to stop the reconstruction processing immediately and the other option is to return an error response to request the host to delay the execution of recording and reproduction until the reconstruction processing is ended.

Lastly, in addition to RAD entry and CRD entry that are types of a DFL indicating a defect in the user data area, PBA (Possibly Bad Area) entry and NRD (Non-Re-allocatable Defect) entry may also be used for BD-RE. A cluster registered as PBA entry is a cluster which will possibly become defective on the disc because the cluster was treated as defective in the past, and a cluster registered as NRD entry is a cluster which will possibly become detective because data could not be reproduced therefrom and whose data is not recorded in the spare area. In most cases, the DFL of a cluster in which a failure occurs during the record and verify operation is rarely registered as PBA entry or NRD entry; instead, a DFL is registered as PBA entry or NRD entry during the reproduction or formatting of a cluster. Therefore, in this embodiment, there is no need for considering PBA entry and NRD entry when considering an operation during the record and verify operation. However, in some cases, the user data area on a disc, which has been used many times, contains data registered as PBA entry or NRD entry. Whether or not data is recorded in a cluster registered as PBA entry or NRD entry depends on the specification of the recording and reproducing apparatus. If the specification defines that an attempt be made to record data in a cluster registered as PBA entry or NRD entry and, as a result, spare area recording data is recorded in the spare area, PBA entry or NRD entry is re-registered as RAD entry or CRD entry and so the operation described in this embodiment is not affected. On the other hand, if the specification defines that an attempt not be made to record data in a cluster registered as PBA entry or NRD entry, PBA entry or CRD entry remains registered. In this case, DFLs may not be registered if the area registered as CRD entry includes PBA entry or NRD entry between the start address and the end address.

As described above, the present invention treats clusters in the user data area, which have been normally reproduced by the verification processing, as defective clusters in order to extend the range in which DFLs may be registered as CRD entry and thereby reduce the number of DFLs that are registered. This avoids the condition in which data cannot be written on a disc because the number of DFLs has reached the limit. The present invention also prevents the access performance at reproduction time from being reduced and solves the problem related to it.

Although BD-RE SL is used as an example of a disc in the present invention, the same effect may of course be achieved on a single-layer disc and a double-layer disc.

Although an example of a rewritable medium is described in the first embodiment of the present invention, a recordable medium and a rewritable medium differ only in whether data is recorded or overwritten and, so, the same effect may be achieved by applying the present invention to a recordable medium.

It is to be understood that the present invention is applicable not only to the optical disc described in the embodiments but also to a recording medium that has an area conceptually similar to the alternate processing data recording area or the management information storage area and that the same effect may be achieved also on that recording medium.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

The invention claimed is:

1. A recording and reproducing apparatus having a defect management function that records and reproduces data in units of predetermined recording blocks, using a medium having a user data area, an spare area, and a management information storage area updated when the spare area is used wherein during defect management processing, a DFL (Defect List) is registered as RAD (Re-Allocated Defect) entry when an alternate source block is composed of one recording block and a DFL is registered as CRD (Contiguous Re-allocated Defect) entry when an alternate source block is composed of contiguous recording blocks, said recording and reproducing apparatus comprising:

a verification unit which performs verification processing for reproducing recorded data and determining a reproduction result;

a DFL registration determination unit which determines a DFL registration type based on the result of said verification unit;

a management information storage unit which stores management information, which includes DFL information, in the management information storage area based on the result of said DFL registration determination unit; and an spare area recording data recording unit which records spare area recording data in the spare area based on the result of said DFL registration determination unit, wherein said DFL registration determination unit treats a recording block, preceded and followed by one or more RAD entry- or CRD entry-registered defective blocks in the user data area and not recorded in the spare area, as a defective block and registers the recording block, together with the preceding and following RAD entries or CRD entries, as a part of CRD entry.

2. The recording and reproducing apparatus according to claim 1 wherein when said verification unit performs verification processing in units of predetermined blocks and performs Nth (N is a natural number) verification processing and (N+1)th verification processing continuously and when one or more blocks, including a last recording block in the Nth verification processing unit, are recorded contiguously in the spare area, said DFL registration determination unit treats the one or more non-reproducible blocks in the Nth verification processing unit including the last recording block and non-reproducible blocks to a position in the (N+1)th verification processing unit as one sequence of non-reproducible blocks and registers blocks from the DFL-registered RAD entry or CRD entry block in the Nth verification processing unit to the non-reproducible block in the (N+1)th verification processing unit as a CRD entry block.

3. The recording and reproducing apparatus according to claim 2 wherein said DFL registration determination unit registers a DFL by treating a part or all of normally reproduced blocks in the (N+1)th verification processing unit as defective blocks.

4. A recording method for use on a recording and reproducing apparatus having a defect management function that records and reproduces data in units of predetermined recording blocks, using a medium having a user data area, an spare area, and a management information storage area updated when the spare area is used wherein during defect management processing, a DFL is registered as RAD entry when an alternate source block is composed of one recording block and a DFL is registered as CRD entry when an alternate source block is composed of contiguous recording blocks, said recording method comprising the steps of:

treating a recording block, preceded and followed by one or more RAD entry- or CRD entry-registered defective blocks in the user data area and not recorded in the spare area, as a defective block; and registering the recording block, together with the preceding and following RAD entries or CRD entries, as a part of CRD entry.

5. The recording method according to claim 4 wherein when verification processing is performed in units of predetermined blocks and Nth verification processing and (N+1)th verification processing are performed continuously and when one or more blocks, including a last recording block in the Nth verification processing unit, are recorded contiguously in the spare area, the one or more non-reproducible blocks in the Nth verification processing unit including the last recording block and non-reproducible blocks to a position in the (N+1)th verification processing unit are treated as one sequence of non-reproducible blocks and blocks from the DFL-registered RAD entry or CRD entry block in the Nth verification processing unit to the non-reproducible block in the (N+1)th verification processing unit are registered as a CRD entry block.

6. The recording method according to claim 5 wherein the DFL registration determination method is such that a DFL is registered by treating a part or all of normally reproduced blocks in the (N+1)th verification processing unit as defective blocks.

7. The recording and reproducing apparatus according to claim 1, further comprising:

a DFL and spare area recording data reconstruction determination unit; and a DFL and spare area recording data reconstruction unit wherein based on a determination result of said DFL and spare area recording data reconstruction determination unit or on an instruction from a higher-level device connected to said recording and reproducing apparatus, said DFL and spare area recording data reconstruction unit treats a recording block, preceded and followed by one or more RAD entry- or CRD entry-registered defective blocks in the user data area and not recorded in the spare area, as a defective block and registers the recording block, together with the preceding and following RAD entries or CRD entries, in the management information storage area as a part of CRD entry, and records spare area recording data, generated according to reconstructed DFLs, in the spare area.

8. The recording and reproducing apparatus according to claim 7, further comprising:

a DFL remaining amount checking unit which checks a number of DFLs that may be registered in the management information storage area; and an spare area remaining amount checking unit which checks a remaining amount of the spare area in which data may be recorded wherein if, when said DFL remaining amount checking unit determines that the number of registered DFLs has either reached a limit of the number of DFLs that may be registered or exceeded a predetermined, fixed number of DFLs that may be registered, said DFL and spare area recording data reconstruction determination unit determines that said spare area remaining amount checking unit determines that half or more of the spare area on said disc is free, said recording and reproducing apparatus treats a recording block, preceded and followed by one or more RAD entry- or CRD entry-registered defective blocks in the user data area and not recorded in the spare area, as a defective block and registers the recording block, together with the preceding and following RAD entries or CRD entries, in the management information storage area as a part of CRD entry and records spare area recording data, generated according to reconstructed DFLs, in the spare area.

9. The recording and reproducing apparatus according to claim 7, wherein when spare area recording data and user data corresponding to the reconstructed DFLs are reconstructed, said DFL and spare area recording data reconstruction unit uses a logically unused area in the spare area as a work area for temporary saving.

10. The recording and reproducing apparatus according to claim 7, wherein when said recording and reproducing apparatus does not perform a recording and reproducing operation for a predetermined period of time, said DFL and spare area recording data reconstruction unit treats a recording block, preceded and followed by one or more RAD entry- or CRD entry-registered defective blocks in the user data area and not recorded in the spare area, as a defective block and registers the recording block, together with the preceding and following RAD entries or CRD entries, in the management information storage area as a part of CRD entry and records spare area recording data, generated according to the reconstructed DFLs, in the spare area.

11. A recording method for use on a recording and reproducing apparatus having a defect management function that records and reproduces data in units of predetermined recording blocks, using a medium having a user data area, an spare area, and a management information storage area updated when the spare area is used wherein said recording method, which is initiated by a self-determination of said recording and reproducing apparatus or by an instruction from a higher-level device connected to said recording and reproducing apparatus, comprises the steps of:

treating a recording block, preceded and followed by one or more RAD entry- or CRD entry-registered defective blocks in the user data area and not recorded in the spare area, as a defective block and registering the recording block, together with the preceding and following RAD entries or CRD entries, in the management information storage area as a part of CRD entry; and recording spare area recording data, generated according to the reconstructed DFLs, in the spare area.

12. The recording method according to claim 11, wherein the self-determination criterion of said recording and reproducing apparatus is that, when it is determined that a number of registered DFLs has either reached a limit of the number of DFLs that may be registered or exceeded a predetermined, fixed number of DFLs that may be registered, it is determined that the half or more of the spare area on said disc is free.

13. The recording method according to claim 11, wherein when spare area recording data and user data corresponding to the reconstructed DFLs are reconstructed, a logically unused area in the spare area is used as a work area for temporary saving.

14. The recording method according to claim 11, wherein the self-determination criterion of said recording and reproducing apparatus is that said recording and reproducing apparatus does not perform a recording and reproducing operation for a fixed period of time.

15. A reproducing method wherein a medium on which data is recorded by the recording method according to claim 4 is reproduced according to DFLs.

16. A reproducing method wherein a medium on which data is recorded by the recording method according to claim 5 is reproduced according to DFLs.

17. A reproducing method wherein a medium on which data is recorded by the recording method according to claim 6 is reproduced according to DFLs.

18. A reproducing method wherein a medium on which data is recorded by the recording method according to claim 11 is reproduced according to DFLs.

19. A reproducing method wherein a medium on which data is recorded by the recording method according to claim 12 is reproduced according to DFLs.

20. A reproducing method wherein a medium on which data is recorded by the recording method according to claim 13 is reproduced according to DFLs.

21. A reproducing method wherein a medium on which data is recorded by the recording method according to claim 14 is reproduced according to DFLs.

* * * * *